US007346665B2

(12) United States Patent
Courtemanche et al.

(10) Patent No.: US 7,346,665 B2
(45) Date of Patent: Mar. 18, 2008

(54) SYSTEM AND METHOD FOR MULTILEVEL GOVERNMENT INFORMATION ACCESSING KIOSK WITH UNIFORM DISPLAY

(75) Inventors: Paul R. Courtemanche, Vienna, VA (US); Susan Smoter, Laurel, MD (US)

(73) Assignee: United States Postal Service, Washington, DC (US)

( * ) Notice: Subject to any disclaimer, the term of this patent is extended or adjusted under 35 U.S.C. 154(b) by 608 days.

(21) Appl. No.: 10/163,721

(22) Filed: Jun. 4, 2002

(65) Prior Publication Data

US 2003/0225860 A1    Dec. 4, 2003

Related U.S. Application Data

(60) Provisional application No. 60/295,003, filed on Jun. 4, 2001.

(51) Int. Cl.
  *G06F 15/16* (2006.01)
  *G06F 3/041* (2006.01)
(52) U.S. Cl. ........................ 709/217; 345/173
(58) Field of Classification Search ................ 713/166; 709/203, 217; 345/173
See application file for complete search history.

(56) References Cited

U.S. PATENT DOCUMENTS

| | | | |
|---|---|---|---|
| 5,867,821 A | 2/1999 | Ballantyne et al. | |
| 5,878,403 A | 3/1999 | DeFrancesco et al. | |
| 6,105,007 A | 8/2000 | Norris | |
| 6,105,010 A | 8/2000 | Musgrave | |
| 6,208,995 B1 | 3/2001 | Himmel et al. | |
| 2002/0085035 A1* | 7/2002 | Orbanes et al. | 345/764 |
| 2004/0148290 A1* | 7/2004 | Merenda et al. | 707/10 |
| 2005/0065950 A1* | 3/2005 | Chaganti et al. | 707/100 |

* cited by examiner

*Primary Examiner*—Jason Cardone
*Assistant Examiner*—Tanim Hossain
(74) *Attorney, Agent, or Firm*—Levis and Roca LLP

(57) ABSTRACT

A system and method is provided that allows a user to access life event information. Publicly accessible computer kiosks are provided. An individual user may make selections on the publicly accessible computer as to information or data the user is interested in viewing. The selection may be made by activating one of a number of touch screen buttons. The user may be directed to an ultimate item of information by going through a succession of screens that narrow the user's selection. When the user has identified an item of information the request is routed through a life event server to an appropriate content server. A content server may be a computer of a government entity where life event information is stored. The content server selects the requested information and returns it to the user.

7 Claims, 5 Drawing Sheets

SYSTEM AND METHOD FOR MULTILEVEL GOVERNMENT INFORMATION ACCESSING KIOSK WITH UNIFORM DISPLAY

CROSS-REFERENCE TO RELATED APPLICATIONS

This application claims priority from U.S. Provisional Application No. 60/295,003 filed on Jun. 4, 2001, entitled "Life Event Server." The contents of the above application is relied upon and expressly incorporated by reference as if fully set forth herein.

STATEMENT REGARDING FEDERALLY SPONSORED RESEARCH OR DEVELOPMENT

The invention was made by an agency of the United States government or under a contract with an agency of the United States government, the United States Postal Service ("USPS" or "Postal Service"), an independent establishment of the executive branch of the U.S. government.

BACKGROUND OF THE INVENTION

1. Field of the Invention

The invention relates generally to a method and system for providing web-based life event information. More particularly the invention relates to systems and methods for providing a single point of entry for a user to interface with multiple government-provided services. Through the single point of entry the user may access government services such as postage, passport services, birth records, and driver's license information. The invention also relates to the selective placement of publicly accessible computers in public settings such as post offices.

2. Description of the Related Art

Communication technology allows individuals to access many kinds and sources of information. Members of the public may seek or receive information through a variety of means. The Internet in particular has increased the options that individuals and institutions have to receive information as well as services. With a personal computer and Internet connection members of the public may gather materials, documents, forms, data, and other kinds of information available on Internet web sites.

The growth of computer technology in recent years has also enabled governmental bodies and agencies to store significant amounts of data. Electronic storage capabilities allow government agencies to store information in electronic form rather than paper form. Further much of the data that is available in government archives is being converted into electronic form. Much of the information stored on government computers is information that is open to public access. Consequently there is at present a vast body of information and data, maintained by government bodies, that could be accessed by the public through the Internet. Nevertheless there are several obstacles that prevent this from happening.

Currently some government information is available by Internet access; however, much information is not. Further there is no uniformity in the collection and presentation of government data and information. Consequently, the citizen, user, or consumer who seeks to find and use government information is first presented with the task of searching for the information that he desires. When an individual locates government-hosted sites they may present information to the public in a variety of different formats and modes. Additionally, there is no means at present to provide a common point of access to data from different levels of government and from different branches of the government. For example, information from the federal government is typically found at present on web sites hosted by a federal agency, and information from state government, county government, and local government is found on separately maintained web sites. Even within a single level of government, such as federal agencies of the executive branch, web sites are separately maintained. Thus the user at present faces a bewildering array of searches, options, and presentations in order to find and retrieve government information.

To the extent government information is available in order to successfully reach such information one must be not only skilled in computer technology ("computer literate"), one must also be savvy or knowledgeable in the methods and techniques of searching for such information. Sadly, this is a real obstacle at present for many Americans. While some individuals may successfully navigate the Internet and search out some of the information they desire, some cannot. And if an individual does successfully obtain some government information, they may nevertheless not be able to access other, more difficult information, or they may be discouraged. Thus significant numbers do not make full use of the efficiencies of Internet access because of complicated methods of presentation.

Moreover, the interaction that an individual may typically engage with a governmental body, through Internet access, is passive in nature. For example, an individual may download forms or obtain government reports and records. In this case the user is merely receiving information. However, in many instances the individual desires to submit information to the government, for example a reservation for a campsite in a national park, or a change of address notice to a state driver's license authority. Typically, if an individual wishes to submit information to a governmental entity, he may download a form and fill out the form, but he must mail or physically deliver the completed form to the governmental entity. And again, when certain government entities do allow the public to submit information via computerized connection, this is an isolated and uncoordinated form of access.

In particular, there is presently no effort to provide life event information to the public through computerized Internet access. Life event information is that government-maintained information that is of key significance to the citizen. It includes information such as citizenship status, immigration records, birth information, marital information, death information, and social security records. Life event information could also include passport information, educational records, and military records. It would be most desirable to provide this information through publicly accessible kiosks. Such kiosks would be computers with Internet access.

There is a final obstacle to granting public Internet access to government information and services. In order to do this a member of the public must have access to a computer with an Internet connection. This is far from a universal national practice. It is proposed to overcome this obstacle by providing computerized Internet access in public locations. In particular, it would be most desirable to include among the locations where such publicly accessible computers are placed, offices of the United States Postal Service.

Accordingly, there is a need for government information to be provided to the public through computerized Internet access. The life event server system should provide a common point of entry or access point. The system should provide life event information that members of the public could access. Ideally the system would be simple so that persons of moderate computer skill could utilize it. The life event server system would provide, through one access point, information from a variety of different governmental entities. In a further embodiment, the system would allow a user to interact with a government entity by submitting information to the governmental entity. It would be desirable to provide a method that obtains the advantages of the present system while minimizing the need for expensive automated equipment.

SUMMARY OF THE INVENTION

It is an object of the present invention to provide a system and method for providing web-based life-event information. The presentation to a user is based upon life events that would encompass such things as births, deaths, education, marriage, job searching, travel, military service, social security records, and any other suitable events. Life events encompass the events for which a governmental entity records information and that is of significance to a citizen or other member of the public. Life events include that information for which members of the public seek access most frequently.

It is a further object of the present invention to provide publicly accessible kiosks that permit users to access government information based on life events. The kiosks would include a computer and Internet connection. The kiosks would be placed in public locations such as post office locations of the US Postal Service.

An additional object of the present invention is to provide a single point of entry to a user to obtain governmental life event information. The access is simplified so that persons with minimal or little computer experience may successfully access the desired information. Individuals with limited computer experience can access the desired governmental site with touch screen displays. In the initial entry screen a user will view an initial set of menus or choices. In a certain embodiment, the menu will consist of selections, buttons, or choices that an individual may activate by touching. For example in a first screen a user may select from federal, state, county, local, and municipality authorities. This will direct the user to a second screen that provides the further options that are available from the initially selected governmental agency.

Still a further object of the present invention is uniformity in presentation. Rather than providing information in a hodgepodge of looks and styles, the life event server displays information in a uniform, ongoing format. The format of the life event server thus encourages certain users to employ the service when such a user might otherwise be put off by a multiplicity of differing formats, styles, and presentations each of which must be separately digested and understood.

Another advantage of the present invention is it allows user authentication through an interactive exchange. In this way a user may obtain government services, or submit information to a governmental entity, online, as posed to downloading a form, filling the form out manually, and physically delivering the form to the appropriate government office.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claim. It is to be understood that both the foregoing general description and the following detailed description are exemplary and explanatory only and are not restrictive of the invention, as claimed. Thus, the present invention comprises a combination of features, steps, and advantages which enable it to overcome various deficiencies of the prior art. The various characteristics described above, as well as other features, will be readily apparent to those skilled in the art upon reading the following detailed description of the preferred embodiments of the invention, and by referring to the accompanying drawings. The accompanying drawings, which are incorporated in and constitute a part of this specification, illustrate embodiments of the invention and, together with the description, serve to explain the principles of the invention.

BRIEF DESCRIPTION OF THE DRAWINGS

For a more detailed description of a preferred embodiment of the present invention, reference will now be made to the accompanying drawings, which form a part of the specification, and wherein.

DETAILED DESCRIPTION OF THE PREFERRED EMBODIMENT

Reference will now be made in detail to exemplary embodiments of the invention, examples of which are illustrated in the accompanying drawings. Wherever possible, the same reference numbers will be used throughout the drawings to refer to the same or like parts.

Figure 1:
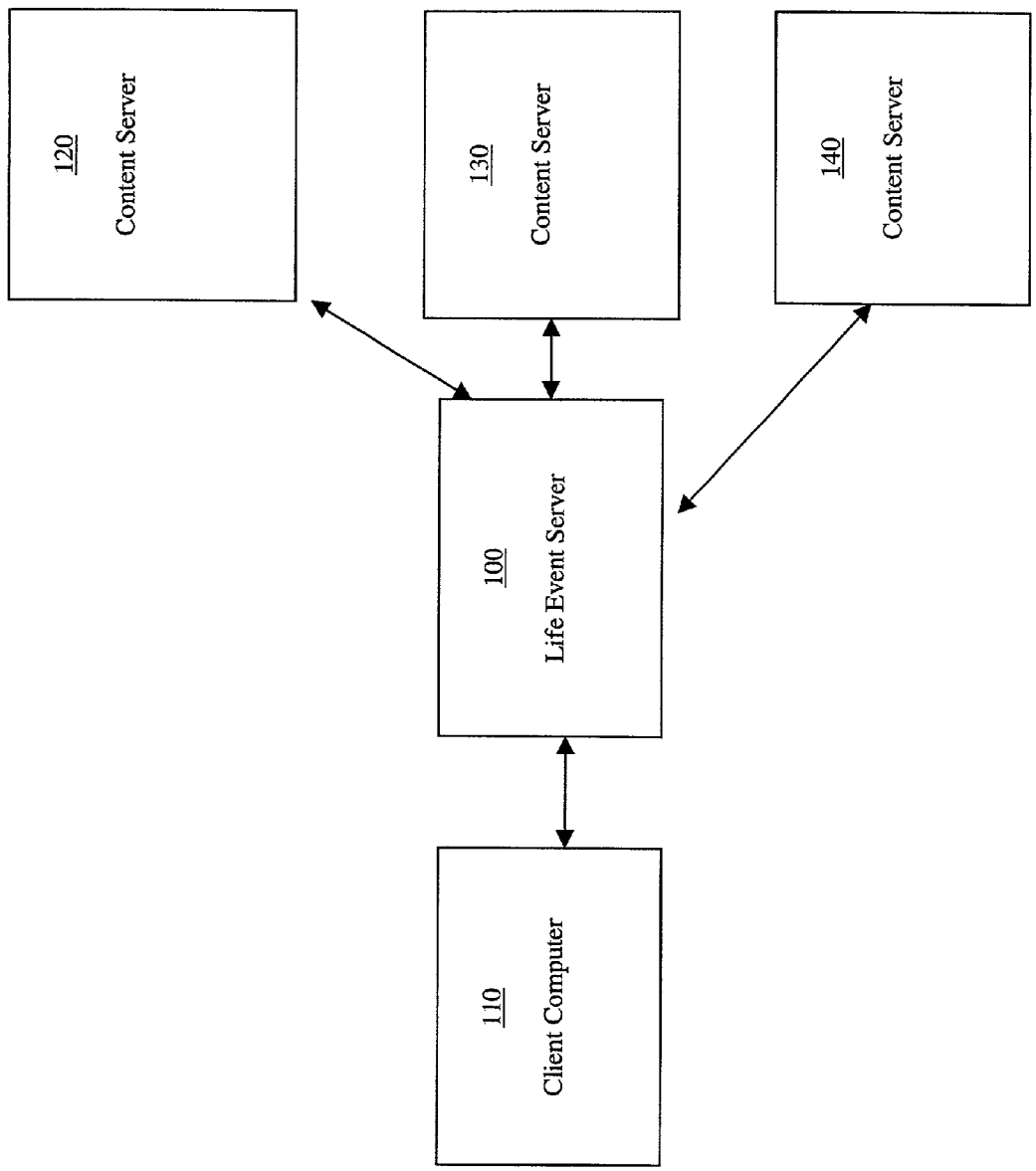
FIG. 1 is a schematic view showing a structure of the life event server system.

Referring initially to FIG. 1 there is shown a schematic of the life event server system. In one embodiment, the life event server system comprises a server 100, client computer 110, and multiple content servers 120, 130, and 140. Life event server 100 is connected, or may be connected, to client computer 110 and content servers 120, 130, and 140 via commonly-used means of data transmission such as phone lines and optical lines. The Internet is a preferred means of connecting client computer 110 with life event server 100. Likewise the Internet is the preferred means of connection between life event server 100 and content servers 120, 130, and 140. Not shown in FIG. 1 are optional intermediary computers such as Internet service providers and routers and other communication hardware such as transmission lines. The life event server system makes use of these commonly available communication and linkage systems.

While FIG. 1 shows a system having a single client computer 110, this is done for the convenience of illustration. It should be understood that systems may be constructed on the principle of the present invention using a plurality of client computers. Indeed, in operation, as described further, it is preferred that life event server 100 be accessible from any individual computer as well as publicly dedicated computers. Thus the number of client computers connected at any one time in the life event server system may be quite large. This is in keeping with an advantage of the life event server which is to provide to users, members of the public, a single, common access point through which to receive information from governmental bodies and to interact with the governmental bodies.

Similarly FIG. 1 shows three content servers 120, 130, and 140 as an illustration of the system. Again the actual number of content servers need not be three. The number may be less than three, but in a preferred embodiment, the number is larger. The content servers contain government information that users may access. In a preferred embodiment, a content server may contain information related to a single government entity, such as birth records. However, alternative embodiments allow a single content server to host information from numerous governmental entities. Thus as an example a single content server may contain information from a state's division of motor vehicles, marriage records, and real property records. It is a further part of the present invention that information hosted on content servers 120, 130, and 140 may be periodically updated. And to facilitate the updating of such information, an individual content server may need to be physically hosted by, or made accessible to, the government body that is responsible for maintaining the information on that content server. Thus it is a part of the present invention that individual content servers be hosted, maintained, and updated by the government body that provides information to the public through that content server.

Life event server 100 may be selected from any of the presently commercially available servers. It is configured to communicate with client computer 110 and to communicate with content servers 120, 130, and 140. The capacity of life event server 100 necessarily depends on the projected number of users who will interact with life event server and with the number of client computers needed to provide the desired information. It is understood that the capacity of life event server 100 will increase as these demands increase.

Content servers 120, 130, and 140 are those government computers that now store publicly available information. Under the present invention, life event server 100 will interact with these computers. An important feature of life event server 100 is the formatting it displays with respect to information maintained on content servers 120, 130, and 140. Life event server receives information from disparate content servers. The formatting of information on these content servers is not expected to be uniform. Nevertheless the function of life event server 100 is to harmonize the information received from various computers so that it generates a uniform display to the client computer 110. In this manner the presentation of information will be simplified for the public.

Client computer 110 may take several embodiments. In one embodiment a client computer is an individual's personal computer with Internet access that links client computer 110 to life event server 100. In an alternative and preferred embodiment, client computer 110 is a publicly available computer or kiosk. Placing such a publicly available client computer 110 in a location such as a post office allows the public to access government information through the Internet. In this manner government information and services can become accessible to those who do not currently have the means to do so privately. Furthermore, placing client computer 110 in a post office assures that the location will be publicly accessible.

Figure 2:
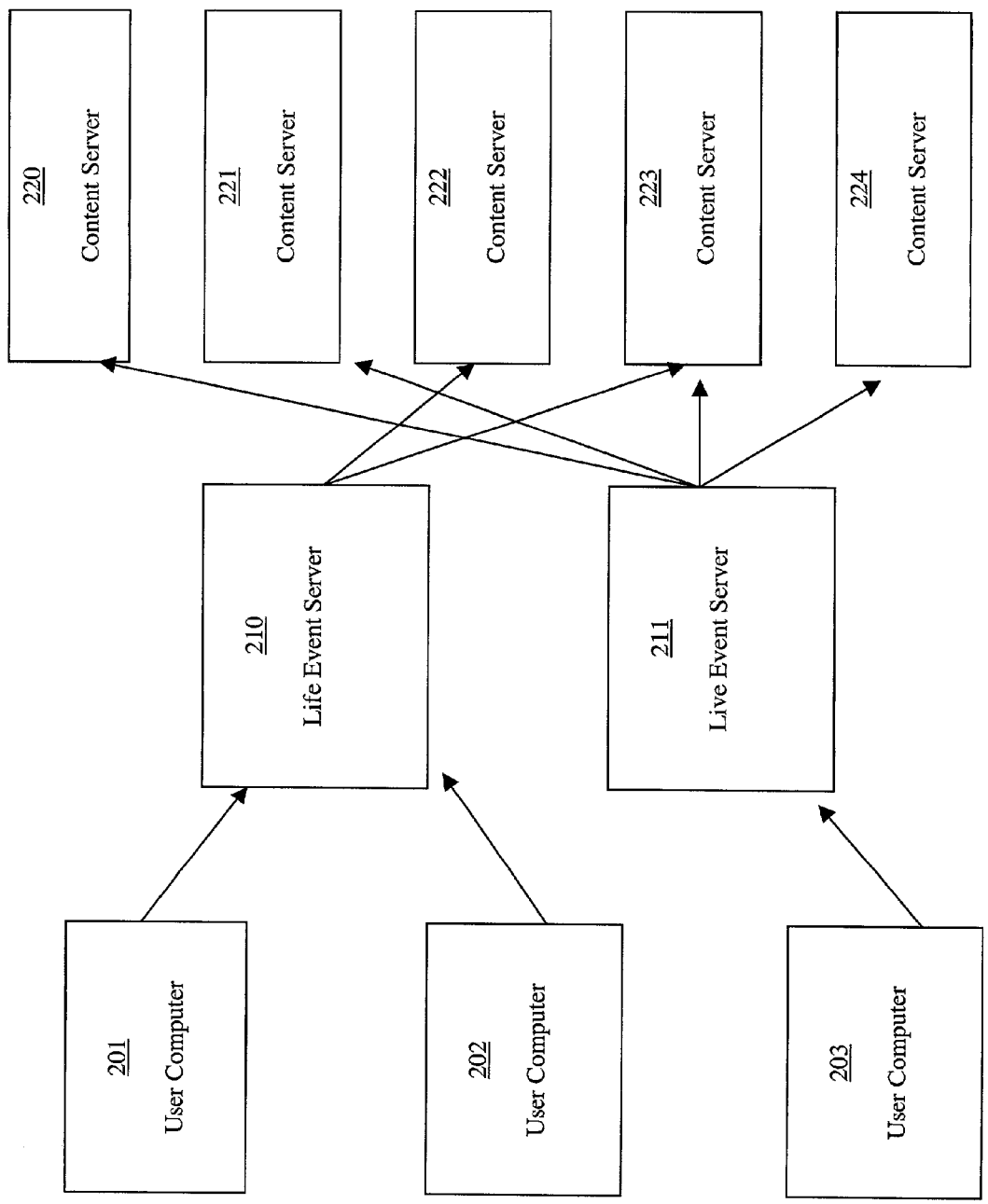
FIG. 2 is a schematic of an alternative structure of the life event server system.

An alternative embodiment of the system of the life event server is shown in FIG. 2. In FIG. 2 there is shown a system having multiple user computers 201, 202, and 203, multiple life event servers 210 and 211, and multiple content servers 220 through 224. In this embodiment a number of life event servers make connection with a number of different user computers.

A further embodiment, not shown, would encompass a single computer acting in both the capacity of a life event server and a content server.

Figure 3:
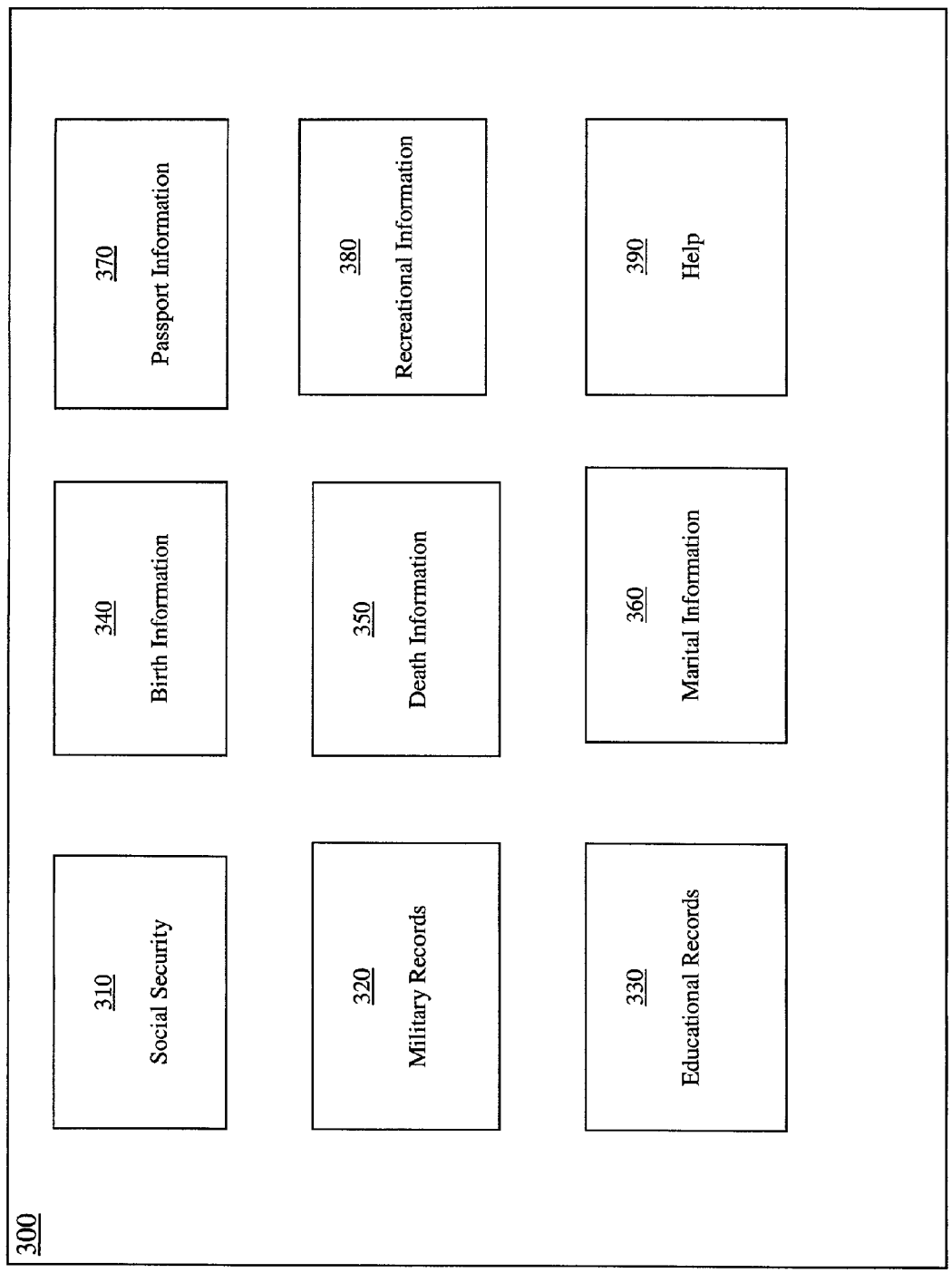
FIG. 3 is a block diagram showing a single entry point to the life event server system as displayed to a user.

Referring now to FIG. 3 there is shown a block diagram displaying a single entry point to the life event server system as displayed to a user. In a preferred embodiment welcome screen 300 displays a number of touch activated buttons. As an example, the buttons may represent topics of common interest to the public. Preferably the touch activated buttons correspond to categories of life event information. As an example the buttons allow access to further screens for information related to social security 310, military records 320, educational records, 330, birth information, 340, death information 350, marital information 360, passport information 370, recreational information 380, and help 390. It should be understood that this is an exemplary list of links that may be provided on welcome screen 300. The actual number of links may be more than this or less than this amount. In an alternative embodiment welcome screen 300 displays buttons that allows a user to select from among different levels or branches of government. Thus, for example buttons may provide links to federal government links, state government links, county government links, and local government links. The formatting of the information displayed on welcome screen 300 and successive screens is uniform in presentation. Thus users will not be confused by varying displays or forms of presentation.

In operation life event server 100 links a client computer 100 with a content server 301. Life event server 100 provides a uniform point of entry to a user. The life event server provides a simplified means for a user to electronically access government information and services over what must be done at present. A user is first greeted with a welcome screen 300. At this level, when seeking information, a user may select from among several links or selections provided. In a preferred embodiment the user does this by touching a touch-activated button on welcome screen 300. By selecting, for example, recreational information, life event server provides a second screen to client computer 110. This screen, again preferably using a display format common to the welcome screen, provides a user with a second level of information. The common format may include features such as the size and shape of the option buttons, colors, and layout of the screen. The purpose being to avoid user confusion. The second screen may, for example, allow a user to make further selections with respect to information sought. Thus the second screen, in a preferred embodiment, displays a second set of touch-activated buttons related to recreational information. This, by way of example, may include links to national parks, hunting information, fishing information, and boating information. By selecting one of these active links, the user is further directed to a screen that provides information at this greater level of detail. In a similar manner life event server 100 displays a successive set of screens until the ultimately desired information is reached. When the user has reached the screen that provides the desired information, the user can print, download, or otherwise store the information. The user can then return, via a home button or back button, to an earlier set of screens.

Figure 5:
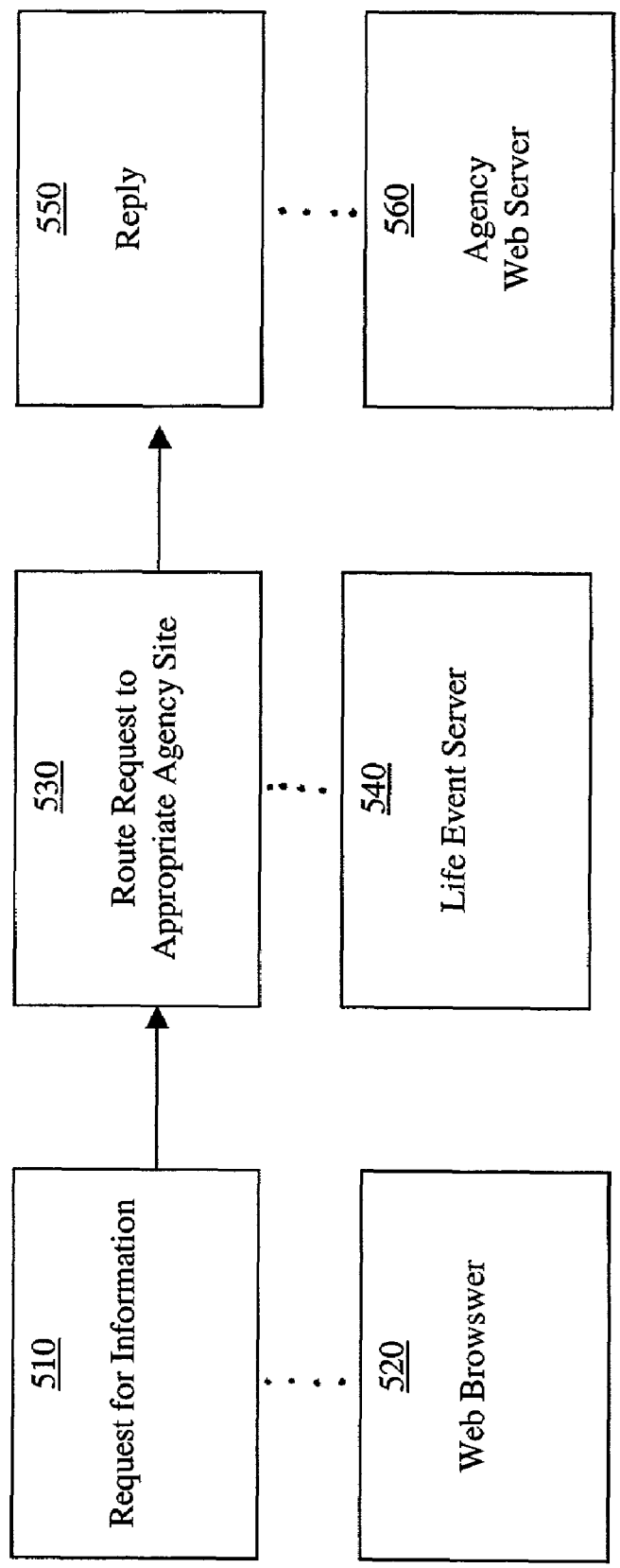
FIG. 5 is a block diagram of the life event server addressing an information request from a user.

FIG. 5 displays a block diagram of a simplified user request. Beginning with step 510 a user first requests information. As shown in FIG. 5, the user's web browser 520 generates the display on the user's computer. The user's request is transmitted to life event server 100. During step 530, life event server routes the request to the appropriate agency site. The agency web server 560 thereupon generates reply 550. Not shown is the return transmission from agency web server 560 to the user.

In a further embodiment of the life event server system there is provided means for a user to interact with a governmental entity. Thus, for example, a user may do more than receive information; a user could in addition submit information to a governmental entity. In one embodiment, this is done on an unsecured basis. In this embodiment, the life event server system would first operate as described above. By selecting a number of links, a user ultimately arrives at the information page he seeks. At this page, the governmental entity will provide an active form, a form that the user can fill out. Once the user has completed the form, he can select a further option that transmits the information on the completed form, via the Internet link, back to the governmental entity. In this manner there is two way communication between the user and the governmental entity. Transmission from the user to the governmental entity is in this case unsecured, that is there is no request for the user to prove an identity or provide other authorization in connection with the information transmitted to the governmental entity.

Figure 4:
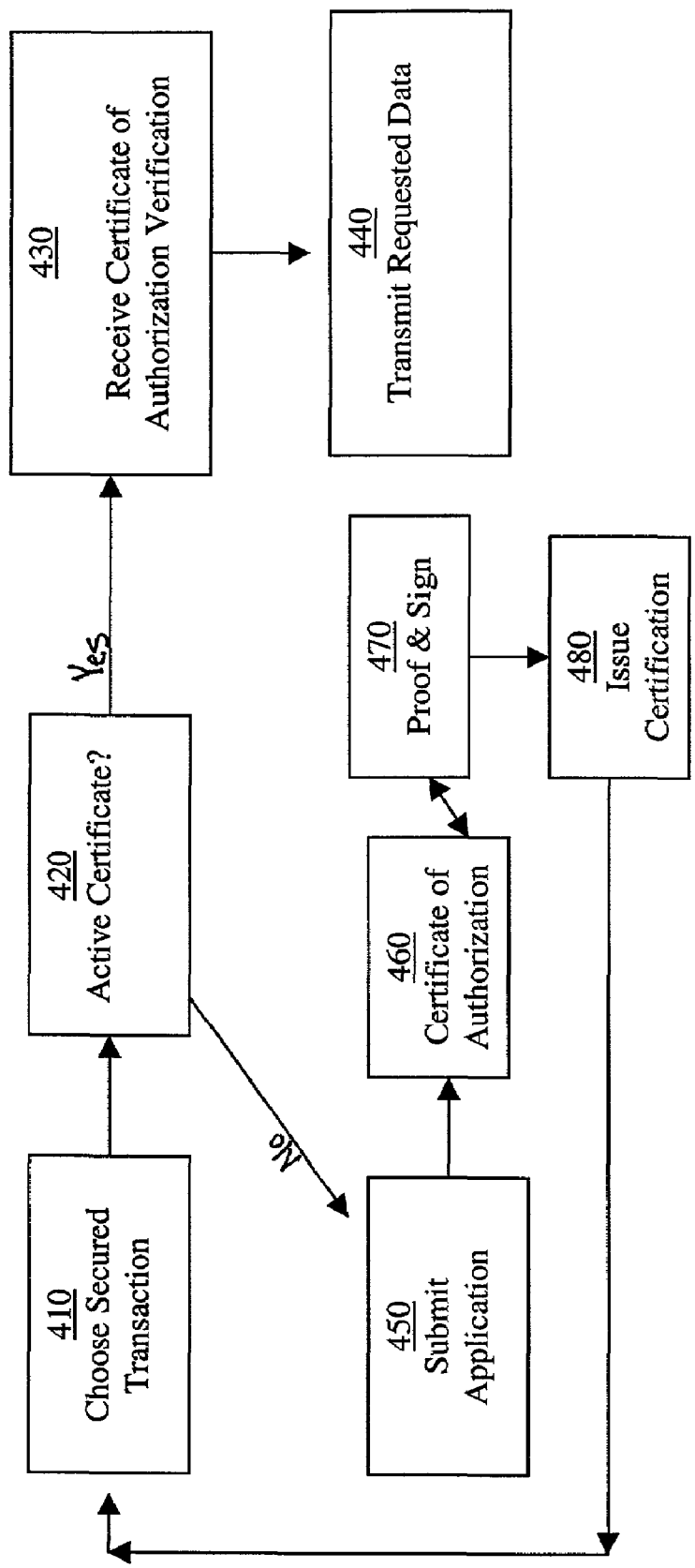
FIG. 4 is a flow chart of the method to provide authenticated or digital identification transactions on the life event server system.

In an alternative embodiment the life event server system allows for secured transmissions from users. Referring now to FIG. 4, there is shown a method to provide a certificate of authorization to a user. Providing such a certificate provides the user an electronic authorization. The certificate of authorization allows the user to pursue secured transactions on the life event server system.

The process for secured transactions begins in step 410 where a user selects, from alternatives provided on the life event server, a secured transaction. An example of a secured transaction might include requesting a copy of a birth certificate. After transmitting his request, the system queries, in step 420 whether the user has an active certificate of authorization. If the result of the query is positive, the system moves to step 430 and 440 by receiving the certificate of authorization and then transmitting to the user the requested data. If the response to the query is negative a different set of steps ensues. In step 450 the user receives from the life event server an application for a certificate of authorization. In step 460 the individual user completes the application. In step 470 the system validates the request by asking the individual to proof and sign the application. The signature in step 470 may include an electronic signature or other alternative form of electronic identification. A preselected password may also be included as the signature in step 470. When that step is completed the life event server system issues a certificate of authorization in step 480. The system thereupon returns the user to the initial entry point, the screen where the user requested a secured transaction. The user may now proceed with and complete the secured transaction.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. One of ordinary skill in the art will recognize that the process just described may easily have steps added, taken away, or modified without departing from the principles of the present invention. Accordingly, the scope of protection is not limited to the embodiments described herein, but is only limited by the claims which follow, the scope of which shall include all equivalents of the subject matter of the claims.

What is claimed is:

1. A method comprising:

locating a kiosk in a publicly accessible office of a hierarchically structured government having a plurality of levels in said hierarchically structured government;

receiving at the kiosk a uniform display from a first server for display on the display screen, wherein the kiosk is one of a plurality of kiosks each;

being situated in said publicly accessible office;

having a display screen for receiving by the touch of a user thereof an input request, wherein the input request;

is made via a plurality of said touches upon a uniform display that is displayed upon the display screen; and specifies via plurality of said touches:

a plurality of levels of said hierarchically structured government; and a request for information respectively associated with each specified level;

at the first server:

preparing a transmission addressed to the kiosk, wherein:

the first server is one of a plurality of said first servers in communication with one or more said kiosks; and said plurality of first servers are in communication with a plurality of second servers each storing information associated with at least one level of the hierarchically structured government, each said transmission includes said uniform display for output on the display screen of the one said kiosk;

receiving one said input request from the one said kiosk, wherein the one said input request includes:

the specified plurality of levels of said hierarchically structured government; and the request for information respectively associated with each said specified level, wherein for each said input request received from the one said kiosk;

identifying from the one said input request each said level of the hierarchically structured government to which the request for information is associated and the second server that stores said requested information;

addressing a transmission to respective said second servers corresponding to the level of the hierarchically structured government to which the request for information is associated, wherein each said transmission includes that portion of the one said input request corresponding to said requested information;

receiving each said second server respective answers to the one said input request;

formatting said respective answers received from each said second server for the uniform display; and preparing a transmission of the uniform display containing the respective answers formatted for the uniform display, wherein the transmission is addressed to the corresponding said kiosk that originated the one said input request that was received from the one said kiosk.

2. The method as defined in claim 1, wherein the uniform display comprises:

a first welcome screen to the user, wherein said first welcome screen provides touch-activated links to said plurality of levels of said hierarchically structured government; and information that can be requested that is respectively associated with each said specified level.

3. The method as defined in claim 1, wherein the uniform display comprises an input field for receiving, from the user, information for transmission to a corresponding one said second server.

4. The method as defined in claim 3, wherein the information from the user for transmission to a corresponding one said second server comprises a request for a certificate of authorization.

5. The method as defined in claim 4, wherein a transmission of the request for the certificate of authorization from one said kiosk includes a request for a secure transaction between the one said kiosk, one said first server, and the one said second server.

6. The method as defined in claim 1, further comprising, at each said first server:

receiving from one or more said kiosks the user information received in the input field; and forming a transmission addressed to the corresponding one said second server for storage in the same.

7. The method as defined in claim 1, wherein each said first server further comprises means for receiving and transmitting communications respectively from and to a plurality of network devices.

\* \* \* \* \*